United States Patent Office

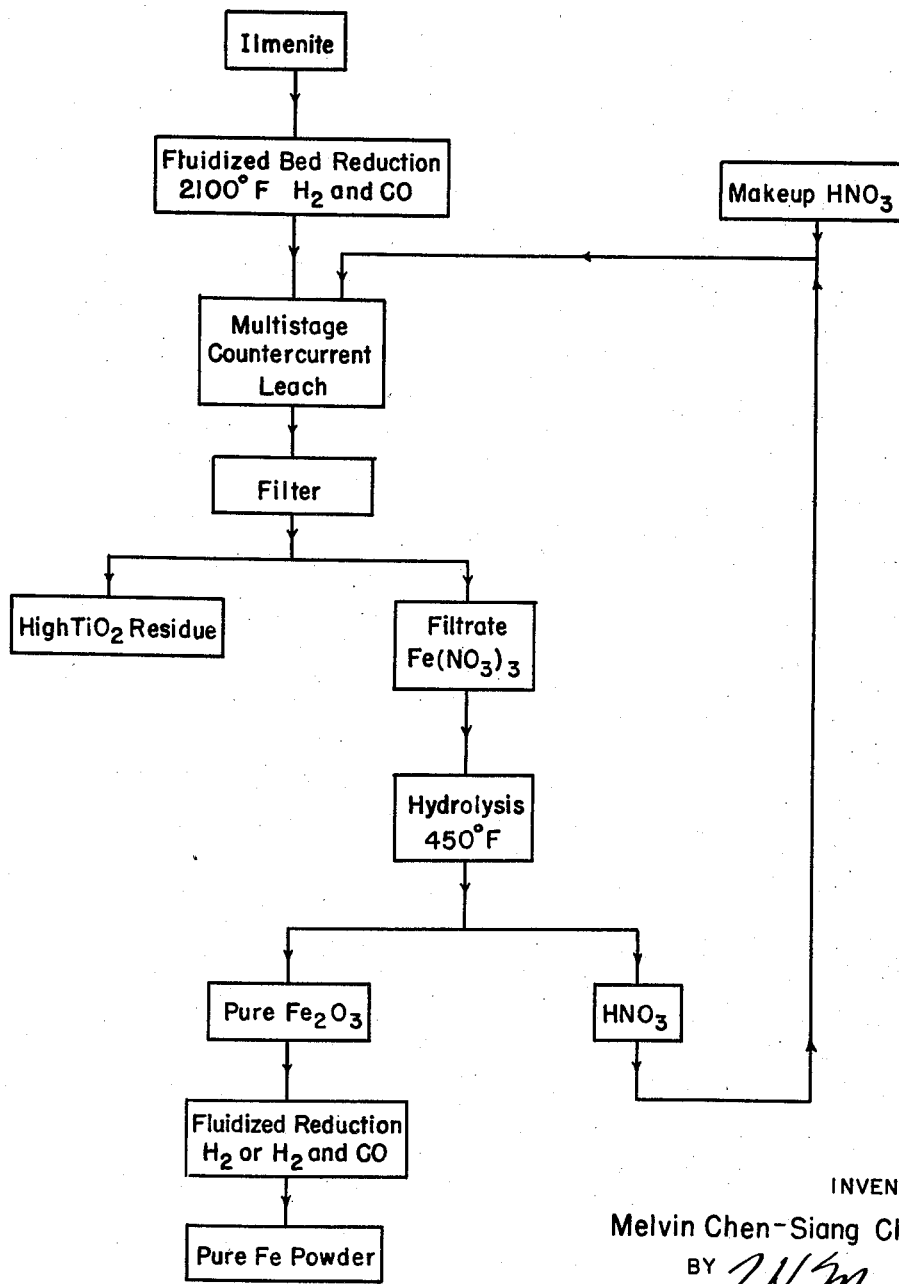

2,912,320
Patented Nov. 10, 1959

2,912,320

PROCESS FOR TREATING MATERIALS CONTAINING TITANIUM AND IRON

Melvin Chen Siang Chang, Pittsburgh, Pa., assignor to Crucible Steel Company of America, Pittsburgh, Pa., a corporation of New Jersey Application January 24, 1958, Serial No. 710,995

11 Claims. (Cl. 75—34)

This invention pertains to the upgrading of ilmenite and related titanium and iron containing ores, and provides an improved process of this character involving gaseous reduction of the iron oxide in the ore followed by nitric acid leaching for separation and recovery of the titanium dioxide and iron values. In the process of the invention, the leaching acid is recovered and recycled.

The leach residue, which contains better than 70% titanium dioxide depending on the extent of the reduction, can be used as a raw material for making $TiO_2$ pigment and for the production of titanium tetrachloride or lower order chlorides in the production of titanium sponge.

In the preferred embodiment of the invention, the iron values are recovered as pure iron powders which can be shaped into articles by powder metallurgy techniques, as by pressing and sintering.

The invention thus provides a novel, simple and economical process for upgrading ilmenite and related ores in which the titanium and iron values are recovered in pure or relatively pure and commercially usable form.

The titanium ore which is most abundant in the earth's crust is ilmenite ($FeO.TiO_2$), raw concentrates of which usually contain between 30 to 60% by weight $TiO_2$ and about 25 to 40% Fe. Since iron accounts for about 40 to 80% by weight of the titanium dioxide content of ilmenite, any upgrading process, to be economical, should provide for recovery of the iron in a commercially usable form, and preferably as substantially pure iron.

One method of recovering the titanium values involves direct smelting of the ore or concentrate in an electric arc furnace with the production of high titanium dioxide slag and low grade iron. The process is exceedingly difficult to handle since the slag is highly corrosive and rapidly attacks the furnace lining. Also the by-product is only pig iron.

Iron may also be separated from ilmenite by digestion with strong sulfuric acid. In this process the acid dissolves the iron without attacking the titanium. However, the by-product is ferrous sulfate in solution for which there is no economical process for recovering the iron and sulfuric acid values. Furthermore, the ferrous sulfate solution creates a serious disposal problem.

The iron values cannot be directly leached from the ilmenite with an acid, such as nitric acid, to form, for example, iron nitrate from which the iron values can be recovered, as pointed out below. Nitric acid does not attack ilmenite under normal digesting conditions.

In accordance with the process of the invention, broadly stated, the ore is reduced either at an elevated temperature and relatively low pressure or, alternatively, at a lower temperature under high pressure. The reducing agent may be carbon monoxide, hydrogen or a hydrocarbon such as coke oven gas or natural gas. The resulting sinter is leached with aqueous nitric acid which removes the iron as iron nitrate in solution. The nitric acid does not attack the titanium dioxide which is left as residue, and its removal may be effected by any known method of solid-liquid separation. The iron nitrate filtrate is heated to hydrolyze the pure ferric oxide with regeneration of the nitric acid, which is separated by filtering and recycled. The iron oxide may be used as such, as in blast furnace reduction to low grade pig iron, but in accordance with the preferred embodiment of my invention, it is reduced with hydrogen to a pure iron powder, usable for purposes aforesaid.

Having thus described the invention in general terms, reference will now be had, for a more detailed description, to the annexed flow sheet, illustrative of the process.

The ilmenite is first finely ground, preferably to minus 100-mesh, and then contacted at elevated temperature with a gaseous reducing agent. The ore is fluidized at a temperature well below the melting point of iron, preferably between about 1800 and 2200° F., and a gaseous reducing agent such as hydrogen, carbon monoxide or a mixture of CO and $H_2$ is passed through the fluid bed. Relatively cheap reform natural gas or coke oven gas may also be used. While the latter gas may be employed successfully, it is naturally preferable to employ a reform gas or other gaseous reducing agent which is substantially free of cyanides, thiocyanates, etc., in order to avoid complications in subsequent processing for the recovery of acid and iron. During reduction with hydrogen or carbon monoxide, for example, the following reactions occur:

(1)    $FeO.TiO_2 + H_2 \rightarrow Fe + H_2O + TiO_2$ (2)    $FeO.TiO_2 + CO \rightarrow Fe + CO_2 + TiO_2$

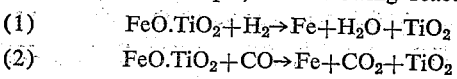

When the iron values are completely reduced or substantially so, the reduced ore is cooled and transferred to leaching apparatus where the material is contacted at ambient temperatures with aqueous nitric acid, preferably of a concentration between about 20 and 40% $HNO_3$. While the desired results may be obtained simply by mixing the acid and reduced ore, leaching is preferably carried out in apparatus designed for the countercurrent flow of acid and solid material. During leaching, iron is removed from the reduced ore in accordance with the following equation:

(3)    $Fe + 4HNO_3 \rightarrow Fe(NO_3)_3 + 2H_2O + NO$

In order to avoid loss of nitrogen values, leaching is conducted in a closed vessel under an oxygen-containing atmosphere for example with air or oxygen overpressure. In the presence of oxygen the nitric oxide is oxidized to nitrous oxide, i.e., $2NO + O_2 \rightarrow 2NO_2$, which readily dissolves in the leaching medium to regenerate nitric acid as follows:

(4)    $3NO_2 + H_2O \rightarrow 2HNO_3 + NO$

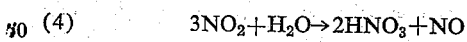

The leached material is then filtered and the solid residue contains 70% or more of $TiO_2$ depending on the extent of the reduction.

The filtrate, comprising ferric nitrate and any excess nitric acid, is then hydrolyzed in a closed vessel preferably under any oxygen or air overpressure to convert the nitrate to ferric oxide and nitric acid as follows:

(5)    $2Fe(NO_3)_3 + 3H_2O \rightarrow Fe_2O_3 + 6HNO_3$

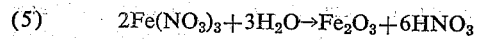

Hydrolysis can be conducted in a stainless steel autoclave. While the reaction commences at about 300° F., hydrolysis is much more rapid at higher temperature, and is preferably carried out between about 400 and 500° F.

The ferric oxide granular powder and nitric acid products of the hydrolysis are separated easily as by filtration and the acid recycled to the leaching step. Thus, the bulk of the nitric acid employed in leaching is recovered following hydrolysis, and only very little makeup acid is required for the next leaching.

The ferric oxide residue is highly pure and susceptible to convenient conversion to iron powder. This may be accomplished by a fluidized bed reduction, preferably with hydrogen, and results in the production of substantially pure iron powder.

*Example 1.*—An ilmenite concentrate containing 38% $TiO_2$ and 39% iron was ground to pass through a 200-mesh sieve. The finely divided sample was reduced at 2000° F. in a stream of hydrogen for 60 minutes. The reduced material was cooled to room temperature. A 400-gram sample of the reduced material was leached for 30 minutes with two liters of solution containing 300 grams per liter of nitric acid which was in amount slightly in excess of that theoretically required to react with the iron present. The operation was carried out in a closed vessel under an oxygen pressure of 100 p.s.i. There was virtually no loss of nitric acid. The material from the leaching step was then filtered and the residue analyzed at 70.5% $TiO_2$. The iron extraction was 90% of the total iron in the feed. The filtrate, containing 79 grams per liter iron and 294 grams per liter total nitrate was placed in an autoclave under 50 p.s.i. oxygen pressure and the contents were heated to 450° F., held there for 30 minutes and cooled. The hydrolyzed mixture was then filtered and it was found that 89% of the iron was precipitated as $Fe_2O_3$ containing less than 0.2% impurities. The final undiluted filtrate contained 291 grams per liter total nitrate indicating only very small acid loss apart from that which could be recovered by washing the filter cake. The oxide in finely divided form was washed, dried and reduced in a stream of hydrogen at 1500° F. for 90 minutes to substantially pure iron powder.

*Example 2.*—A 275-gram sample of the reduced material was leached in 1.5 liters of the final filtrate from Example 1 which contains 9 grams per liter iron and 266 grams per liter free nitric acid (291 grams per liter total nitrate). After removing the high $TiO_2$ residue the leach liquor was heated in autoclave as prescribed in Example 1. The filtrate analyzed 9.5 grams per liter iron. Essentially 100% of the iron extracted was precipitated as $Fe_2O_3$.

*Example 3.*—A sample of the same ilmenite concentrate used in Example 1 was reduced at 2000° F. in a stream of hydrogen for 90 minutes. An iron extraction of 93% was obtained when the reduced material was leached in 30% nitric acid solution. The residue analyzed 72% $TiO_2$.

The invention is thus a practical and economic method for upgrading ilmenite with the recovery of substantially all of the iron initially present as a very pure, high-grade powder and $TiO_2$ of commercial grade. The combination of the initial reduction, and subsequent nitric acid leach and hydrolysis of the nitrate-containing solution, results in regeneration and substantially complete recovery of virtually all of the leaching acid. The process thus requires only a small quantity of makeup acid, air, or oxygen if desired, and a reducing gas such as cheap reform gas.

I claim as my invention:

1. A process for recovering titanium dioxide and iron values from ore containing the same, which comprises: reducing the ore with a gaseous reducing agent at elevated temperature below the melting point of iron, leaching the reduced ore with nitric acid, separating the soluble nitrate-containing material from the titanium dioxide-containing residue, hydrolyzing the soluble nitrate-containing material to form ferric oxide and nitric acid, and separating nitric acid from the mixture.

2. A process for recovering titanium dioxide and iron values from ore containing the same, which comprises: reducing the ore in finely divided condition with a gaseous reducing agent at elevated temperature below the melting point of iron, leaching the reduced ore with nitric acid in a confined space under an oxygen-containing atmosphere, separating the soluble, nitrate-containing material from the titanium dioxide-containing residue, hydrolyzing the soluble nitrate-containing material to form ferric oxide and nitric acid, and separating nitric acid therefrom.

3. A process for recovering titanium dioxide and iron values from ore containing the same, which comprises: reducing the ore in finely divided condition with a gaseous reducing agent at elevated temperature below the melting point of iron, leaching the reduced ore with nitric acid in a confined space under an oxygen-containing atmosphere above atmospheric pressure for converting the gaseous nitric oxide evolved into nitric acid and recovering the nitric acid thus formed, separating the soluble leach product from the insoluble leach residue rich in titanium dioxide, hydrolyzing the soluble product at above 300° F. in a confined space under an oxygen-containing atmosphere above atmospheric pressure, to form ferric oxide and nitric acid, and separating nitric acid from the mixture.

4. A process for upgrading ilmenite and recovering titanium dioxide and iron values therefrom, which comprises: reducing the ore in finely divided state with a gaseous reducing agent at elevated temperature below the melting point of iron, leaching the reduced ore with nitric acid under a confined oxygen-containing atmosphere at above atmospheric pressure for regenerating nitric acid from the nitric oxide evolved, separating the soluble leach product from the insoluble residue rich in titanium dioxide, hydrolyzing the soluble product at above 300° F. under a confined oxygen-containing atmosphere to form ferric oxide and nitric acid and separating the nitric acid therefrom.

5. A process for upgrading ilmenite and recovering iron values therefrom, which comprises: reducing the ore in finely divided form with a gaseous reducing agent at a temperature between about 1800 and 2200° F., leaching the reduced ore with nitric acid under a confined oxygen-containing atmosphere above atmospheric pressure for regenerating nitric acid from the nitric oxide evolved, separating the soluble leach product from the insoluble residue rich in titanium dioxide, hydrolyzing the soluble product under a confined oxygen-containing atmosphere at a temperature between about 400 and 500° F. to form ferric oxide and nitric acid, and separating the nitric acid therefrom.

6. A process for upgrading ilmenite and recovering iron values therefrom which comprises reducing the ore in finely divided form with a gaseous reducing agent at a temperature between about 1800 and 2200° F., leaching the reduced ore with nitric acid under a confined oxygen-containing atmosphere above atmospheric pressure for regenerating nitric acid from the nitric oxide evolved, separating the soluble leached product from the insoluble residue rich in titanium dioxide, hydrolyzing the soluble product under a confined oxygen-containing atmosphere at a temperature between about 400 and 500° F. to form ferric oxide and nitric acid, separating the nitric acid therefrom, and recycling the nitric acid thus recovered to the leaching operation.

7. In the process of treating reduced ilmenite to obtain iron values and titanium dioxide, the steps comprising leaching the reduced ilmenite with an aqueous solution of nitric acid to produce soluble ferric nitrate and an insoluble residue rich in titanium dioxide, separating the ferric nitrate from the insoluble residue, hydrolyzing the ferric nitrate to regenerate nitric acid and produce ferric oxides, and separating the ferric oxide from the nitric acid.

8. In the process of treating reduced ilmenite to obtain iron values and titanium dioxide, the steps comprising leaching the reduced ilmenite with nitric acid under acid under oxygen pressure to dissolve the reduced iron product and form ferric nitrate and an insoluble residue rich in titanium dioxide, separating the ferric nitrate from the titanium dioxide by filtration, hydrolyzing the separated ferric nitrate by autoclaving at a temperature above 300° F. to regenerate aqueous nitric acid and produce ferric oxide, and separating the resulting nitric acid from the ferric oxides.

9. In the process of treating reduced ilmenite to obtain iron values and titanium dioxide, the steps comprising leaching the reduced ilmenite with nitric acid in the presence of an oxygen-containing atmosphere to produce ferric nitrate and a residue rich in titanium dioxide, separating the titanium dioxide residue from the ferric nitrate, and hydrolyzing the separated ferric nitrate under a controlled temperature to produce nitric acid and ferric oxides.

10. In the process of treating reduced ilmenite to obtain iron values and titanium dioxide, the steps comprising leaching the reduced ilmenite with an aqueous nitric acid solution to produce a soluble iron salt and an insoluble residue rich in titanium dioxide, separating the soluble iron salt from the insoluble residue, and hydrolyzing the soluble iron salt to produce nitric acid and iron oxides.

11. In the process of treating reduced ilmenite to obtain iron values and titanium dioxide, the steps comprising leaching the reduced ilmenite with nitric acid to produce an iron salt and titanium dioxide, separating the iron salt from the titanium dioxide, and hydrolyzing the iron salt to produce nitric acid and iron oxides.

References Cited in the file of this patent

UNITED STATES PATENTS

| | | |
|---|---|---|
| 1,542,350 | Whittemore | June 16, 1925 |
| 1,824,936 | Travers | Sept. 29, 1931 |
| 2,330,553 | Butler | Sept. 28, 1943 |
| 2,339,793 | Moeklebust et al. | Jan. 25, 1944 |
| 2,339,808 | Ravnestad et al. | Jan. 25, 1944 |
| 2,479,435 | Vesterdal | Aug. 16, 1949 |
| 2,809,105 | Mancke et al. | Oct. 8, 1957 |

OTHER REFERENCES

Jacobson: Encyclopedia of Chemical Reactions, vol. IV, page 9, Reinhold Publishing Corp., 1951, New York, N.Y.